(12) United States Patent
Velicki et al.

(10) Patent No.: US 8,042,767 B2
(45) Date of Patent: Oct. 25, 2011

(54) COMPOSITE FABRIC WITH RIGID MEMBER STRUCTURE

(75) Inventors: Alexander Velicki, Garden Grove, CA (US); Patrick J. Thrash, Corona, CA (US)

(73) Assignee: The Boeing Company, Chicago, IL (US)

( * ) Notice: Subject to any disclaimer, the term of this patent is extended or adjusted under 35 U.S.C. 154(b) by 1084 days.

(21) Appl. No.: 11/849,794

(22) Filed: Sep. 4, 2007

(65) Prior Publication Data
US 2009/0057487 A1 Mar. 5, 2009

(51) Int. Cl.
*B64C 1/06* (2006.01)
(52) U.S. Cl. .................................... 244/117 R; 244/131
(58) Field of Classification Search ............ 244/117 R, 244/119, 123.1, 131, 132
See application file for complete search history.

(56) References Cited

U.S. PATENT DOCUMENTS

| | | |
|---|---|---|
| 2,004 A | 3/1841 | Harris et al. |
| 1,504,547 A | 8/1924 | Egerton |
| 1,976,257 A | 10/1934 | Harper |
| 2,292,372 A | 8/1942 | Gerlach et al. |
| 2,367,750 A | 1/1945 | Murray et al. |
| 2,387,219 A | 10/1945 | Neville |
| 2,750,629 A | 6/1956 | Baudou |
| 2,992,711 A | 7/1961 | Mitchell et al. |
| 3,071,217 A | 1/1963 | Lawrence |
| 3,271,917 A * | 9/1966 | Rubenstein ............ 52/309.17 |
| 3,306,797 A | 2/1967 | Boggs |
| 3,376,184 A | 4/1968 | Ritchey et al. |
| 3,452,501 A | 7/1969 | Sickler et al. |
| 3,490,983 A | 1/1970 | Lee |
| 3,507,634 A | 4/1970 | O'Driscoll |
| 3,526,558 A | 9/1970 | Beeson |
| 3,603,096 A | 9/1971 | Wells |
| 3,879,245 A | 4/1975 | Fetherston et al. |
| 3,974,313 A | 8/1976 | James |
| 3,975,363 A | 8/1976 | Jones |
| 3,976,269 A | 8/1976 | Gupta |
| 3,995,080 A | 11/1976 | Cogburn et al. |
| 4,064,534 A | 12/1977 | Chen et al. |
| 4,086,378 A | 4/1978 | Kam et al. |
| 4,132,755 A | 1/1979 | Johnson |
| 4,186,535 A | 2/1980 | Morton |
| 4,256,790 A | 3/1981 | Lackman et al. |
| 4,310,132 A | 1/1982 | Frosch et al. |
| 4,311,661 A | 1/1982 | Palmer |

(Continued)

FOREIGN PATENT DOCUMENTS

DE  3040838  5/1982

(Continued)

OTHER PUBLICATIONS

U.S. Appl. No. 12/236,355, filed Sep. 23, 2008, Biornstad.

(Continued)

*Primary Examiner* — Tien Dinh
*Assistant Examiner* — Richard R Green
(74) *Attorney, Agent, or Firm* — Perkins Coie LLP

(57) ABSTRACT

A composite structure is provided including a first fabric and a second fabric. A substantially elongate and substantially rigid first member is spaced apart from and coupled with the first fabric via the second fabric. A resin substantially is infused into the first fabric and the second fabric, and substantially encapsulates the first member to form a unitary structure.

21 Claims, 8 Drawing Sheets

U.S. PATENT DOCUMENTS

| | | | |
|---|---|---|---|
| 4,331,495 A * | 5/1982 | Lackman et al. | 244/132 |
| 4,331,723 A | 5/1982 | Hamm | |
| 4,338,070 A | 7/1982 | Nava et al. | |
| 4,410,577 A | 10/1983 | Palmer et al. | |
| 4,416,170 A | 11/1983 | Gibson et al. | |
| 4,443,401 A | 4/1984 | Turner | |
| 4,448,838 A | 5/1984 | McClenahan et al. | |
| 4,463,044 A | 7/1984 | McKinney | |
| 4,490,958 A | 1/1985 | Lowe | |
| 4,492,607 A * | 1/1985 | Halcomb | 156/242 |
| 4,542,055 A * | 9/1985 | Fitzsimmons | 428/102 |
| 4,546,717 A | 10/1985 | Marchesi | |
| 4,548,017 A | 10/1985 | Blando | |
| 4,548,859 A | 10/1985 | Kline et al. | |
| 4,571,355 A | 2/1986 | Elrod | |
| 4,608,220 A | 8/1986 | Caldwell et al. | |
| 4,615,935 A | 10/1986 | Bendig et al. | |
| 4,622,091 A | 11/1986 | Letterman | |
| 4,631,221 A | 12/1986 | Disselbeck et al. | |
| 4,693,678 A | 9/1987 | Von Volkli | |
| 4,699,683 A | 10/1987 | McCowin | |
| 4,715,560 A | 12/1987 | Loyek | |
| 4,736,566 A | 4/1988 | Krotsch | |
| 4,760,444 A | 7/1988 | Nielson et al. | |
| 4,780,262 A | 10/1988 | VonVolkli | |
| 4,790,898 A | 12/1988 | Woods | |
| 4,811,540 A * | 3/1989 | Kallies et al. | 428/119 |
| 4,828,202 A | 5/1989 | Jacobs et al. | |
| 4,830,298 A | 5/1989 | Van Blunk | |
| 4,877,471 A | 10/1989 | McCowin et al. | |
| 4,902,215 A | 2/1990 | Seemann, III | |
| 4,922,232 A | 5/1990 | Bosich | |
| 4,933,232 A | 6/1990 | Trout et al. | |
| 4,941,182 A | 7/1990 | Patel | |
| 4,942,013 A | 7/1990 | Palmer et al. | |
| 4,959,110 A | 9/1990 | Russell | |
| 4,966,802 A | 10/1990 | Hertzberg | |
| 5,024,399 A | 6/1991 | Barquet et al. | |
| 5,058,497 A | 10/1991 | Bishop et al. | |
| 5,086,997 A | 2/1992 | Glass | |
| 5,129,813 A | 7/1992 | Shepherd | |
| 5,148,588 A | 9/1992 | Prillard | |
| 5,152,949 A | 10/1992 | Leoni et al. | |
| 5,178,812 A | 1/1993 | Sanford et al. | |
| 5,223,067 A | 6/1993 | Hamamoto et al. | |
| 5,240,376 A | 8/1993 | Velicki | |
| 5,242,523 A | 9/1993 | Willden et al. | |
| 5,251,849 A | 10/1993 | Torres | |
| 5,262,220 A | 11/1993 | Spriggs et al. | |
| 5,281,388 A | 1/1994 | Palmer et al. | |
| 5,286,438 A | 2/1994 | Dublinski et al. | |
| 5,292,475 A | 3/1994 | Mead et al. | |
| 5,297,760 A | 3/1994 | Hart-Smith | |
| 5,337,647 A | 8/1994 | Roberts et al. | |
| 5,366,684 A | 11/1994 | Corneau, Jr. | |
| 5,384,959 A | 1/1995 | Velicki | |
| 5,399,406 A | 3/1995 | Matsuo et al. | |
| 5,429,326 A | 7/1995 | Garesche et al. | |
| 5,439,549 A | 8/1995 | Fryc et al. | |
| 5,450,147 A | 9/1995 | Dorsey-Palmateer | |
| 5,464,337 A | 11/1995 | Bernardon et al. | |
| 5,518,208 A | 5/1996 | Roseburg | |
| 5,540,126 A | 7/1996 | Piramoon | |
| 5,562,788 A | 10/1996 | Kitson et al. | |
| 5,619,837 A | 4/1997 | DiSanto | |
| 5,622,733 A | 4/1997 | Asher | |
| 5,651,600 A | 7/1997 | Dorsey-Palmateer | |
| 5,683,646 A | 11/1997 | Reiling, Jr. | |
| 5,690,973 A | 11/1997 | Kindt-Larsen et al. | |
| 5,700,337 A | 12/1997 | Jacobs et al. | |
| 5,746,553 A | 5/1998 | Engwall | |
| 5,765,329 A | 6/1998 | Huang et al. | |
| 5,772,950 A | 6/1998 | Brustad et al. | |
| 5,804,276 A | 9/1998 | Jacobs et al. | |
| 5,809,805 A | 9/1998 | Palmer et al. | |
| 5,814,386 A | 9/1998 | Vasiliev et al. | |
| 5,824,255 A | 10/1998 | Ross et al. | |
| 5,830,305 A | 11/1998 | Andersen et al. | |
| 5,871,117 A | 2/1999 | Protasov et al. | |
| 5,893,534 A | 4/1999 | Watanabe | |
| 5,902,535 A | 5/1999 | Burgess et al. | |
| 5,915,317 A | 6/1999 | Thrash et al. | |
| 5,931,107 A | 8/1999 | Thrash et al. | |
| 5,951,800 A | 9/1999 | Pettit | |
| 5,953,231 A | 9/1999 | Miller et al. | |
| 5,954,917 A | 9/1999 | Jackson et al. | |
| 5,963,660 A | 10/1999 | Koontz et al. | |
| 5,979,531 A | 11/1999 | Barr et al. | |
| 6,003,812 A | 12/1999 | Micale et al. | |
| 6,012,883 A | 1/2000 | Engwall et al. | |
| 6,013,341 A | 1/2000 | Medvedev et al. | |
| 6,045,651 A | 4/2000 | Kline et al. | |
| 6,051,089 A | 4/2000 | Palmer et al. | |
| 6,070,831 A | 6/2000 | Vassiliev et al. | |
| 6,074,716 A | 6/2000 | Tsotsis | |
| 6,086,696 A | 7/2000 | Gallagher | |
| 6,099,906 A | 8/2000 | Palmer et al. | |
| 6,112,792 A | 9/2000 | Barr et al. | |
| 6,114,012 A | 9/2000 | Amaoka et al. | |
| 6,114,050 A | 9/2000 | Westre et al. | |
| 6,128,545 A | 10/2000 | Miller | |
| 6,129,031 A | 10/2000 | Sarh et al. | |
| 6,136,237 A | 10/2000 | Straub et al. | |
| 6,155,450 A | 12/2000 | Vasiliev et al. | |
| 6,159,414 A | 12/2000 | Tunis, III et al. | |
| 6,168,358 B1 | 1/2001 | Engwall et al. | |
| 6,187,411 B1 | 2/2001 | Palmer | |
| 6,190,484 B1 | 2/2001 | Appa | |
| 6,198,983 B1 | 3/2001 | Thrash et al. | |
| 6,205,239 B1 | 3/2001 | Lin et al. | |
| 6,229,819 B1 | 5/2001 | Darland et al. | |
| 6,231,941 B1 | 5/2001 | Cundiff et al. | |
| 6,245,275 B1 | 6/2001 | Holsinger | |
| 6,319,447 B1 | 11/2001 | Cundiff et al. | |
| 6,364,250 B1 | 4/2002 | Brinck et al. | |
| 6,374,750 B1 | 4/2002 | Early | |
| 6,390,169 B1 | 5/2002 | Johnson | |
| 6,415,581 B1 | 7/2002 | Shipman et al. | |
| 6,431,837 B1 | 8/2002 | Velicki | |
| 6,451,152 B1 | 9/2002 | Holmes et al. | |
| 6,480,271 B1 | 11/2002 | Cloud et al. | |
| 6,508,909 B1 | 1/2003 | Cerezo Pancorbo et al. | |
| 6,510,961 B1 | 1/2003 | Head et al. | |
| 6,511,570 B2 | 1/2003 | Matsui | |
| 6,514,018 B2 | 2/2003 | Martinez et al. | |
| 6,558,590 B1 | 5/2003 | Stewart | |
| 6,560,843 B2 | 5/2003 | Cundiff et al. | |
| 6,561,478 B2 | 5/2003 | Cundiff et al. | |
| 6,589,618 B2 | 7/2003 | Cundiff et al. | |
| 6,613,258 B1 | 9/2003 | Maison et al. | |
| 6,620,484 B1 | 9/2003 | Bolukbasi et al. | |
| 6,622,974 B1 | 9/2003 | Dockter et al. | |
| 6,644,897 B2 | 11/2003 | Martinez et al. | |
| 6,648,273 B2 | 11/2003 | Anast | |
| 6,663,737 B2 | 12/2003 | Hsiao et al. | |
| 6,692,681 B1 | 2/2004 | Lunde | |
| 6,702,911 B2 | 3/2004 | Toi et al. | |
| 6,709,538 B2 * | 3/2004 | George et al. | 156/73.3 |
| 6,730,184 B2 | 5/2004 | Kondo et al. | |
| 6,749,784 B2 | 6/2004 | Blanchon et al. | |
| 6,766,984 B1 | 7/2004 | Ochoa | |
| 6,779,707 B2 | 8/2004 | Dracup et al. | |
| 6,786,452 B2 | 9/2004 | Yamashita et al. | |
| 6,799,619 B2 | 10/2004 | Holmes et al. | |
| 6,802,931 B2 | 10/2004 | Fujihira et al. | |
| 6,814,822 B2 | 11/2004 | Holmes et al. | |
| 6,817,574 B2 | 11/2004 | Solanille et al. | |
| 6,840,750 B2 | 1/2005 | Thrash et al. | |
| 6,843,953 B2 | 1/2005 | Filsinger et al. | |
| 6,860,957 B2 | 3/2005 | Sana et al. | |
| 6,862,989 B2 | 3/2005 | Belanger et al. | |
| 6,871,684 B2 | 3/2005 | Engelbart et al. | |
| 6,896,841 B2 | 5/2005 | Velicki et al. | |
| 6,910,043 B2 | 6/2005 | Iivonen et al. | |
| 7,025,305 B2 | 4/2006 | Folkesson et al. | |
| 7,039,485 B2 | 5/2006 | Engelbart | |
| 7,039,797 B2 | 5/2006 | Huang et al. | |

| | | |
|---|---|---|
| 7,048,024 B2 | 5/2006 | Clark et al. |
| 7,074,474 B2 | 7/2006 | Toi et al. |
| 7,080,441 B2 | 7/2006 | Braun et al. |
| 7,080,805 B2 | 7/2006 | Prichard et al. |
| 7,083,698 B2 | 8/2006 | Engwall et al. |
| 7,093,797 B2 | 8/2006 | Grether et al. |
| 7,134,629 B2 | 11/2006 | Johnson et al. |
| 7,137,182 B2 | 11/2006 | Nelson |
| 7,159,822 B2 | 1/2007 | Grantham et al. |
| 7,171,033 B2 | 1/2007 | Engelbart et al. |
| 7,193,696 B2 | 3/2007 | Engelbart et al. |
| 7,195,201 B2 | 3/2007 | Grether et al. |
| 7,228,611 B2 | 6/2007 | Anderson et al. |
| 7,236,625 B2 | 6/2007 | Engelbart et al. |
| 7,278,198 B2 | 10/2007 | Olson et al. |
| 7,282,107 B2 | 10/2007 | Johnson et al. |
| 7,289,656 B2 | 10/2007 | Engelbart et al. |
| 7,306,450 B2 | 12/2007 | Hanson |
| 7,325,771 B2 | 2/2008 | Stulc et al. |
| 7,334,782 B2 | 2/2008 | Woods et al. |
| 7,407,556 B2 | 8/2008 | Oldani et al. |
| 7,503,368 B2 | 3/2009 | Chapman et al. |
| 7,527,222 B2 | 5/2009 | Biornstad et al. |
| 7,622,066 B2 | 11/2009 | Brustad et al. |
| 7,624,488 B2 | 12/2009 | Lum et al. |
| 7,655,168 B2 | 2/2010 | Jones et al. |
| 7,662,251 B2 | 2/2010 | Salama et al. |
| 7,716,835 B2 | 5/2010 | Johnson et al. |
| 2002/0185785 A1 | 12/2002 | Thrash et al. |
| 2003/0080251 A1 | 5/2003 | Anast |
| 2004/0071870 A1 | 4/2004 | Knowles et al. |
| 2004/0135294 A1 | 7/2004 | Thrash et al. |
| 2004/0145095 A1 | 7/2004 | McCollum et al. |
| 2004/0183227 A1 | 9/2004 | Velicki et al. |
| 2004/0219855 A1 | 11/2004 | Tsotsis |
| 2004/0222080 A1 | 11/2004 | Tour et al. |
| 2004/0265536 A1* | 12/2004 | Sana et al. ............ 428/119 |
| 2005/0059309 A1 | 3/2005 | Tsotsis |
| 2005/0163965 A1 | 7/2005 | Velicki et al. |
| 2005/0211840 A1 | 9/2005 | Grether et al. |
| 2006/0108058 A1 | 5/2006 | Chapman et al. |
| 2006/0166003 A1 | 7/2006 | Khabashesku et al. |
| 2007/0014645 A1 | 1/2007 | Amirehteshami et al. |
| 2008/0054523 A1 | 3/2008 | Hanson |
| 2008/0286564 A1 | 11/2008 | Tsotsis |
| 2009/0139641 A1 | 6/2009 | Chapman et al. |

FOREIGN PATENT DOCUMENTS

| | | |
|---|---|---|
| DE | 3331494 | 3/1985 |
| DE | 19536675 | 2/1997 |
| EP | 0198744 A1 | 10/1986 |
| EP | 0319797 | 6/1989 |
| EP | 0659541 | 6/1995 |
| EP | 0833146 | 4/1998 |
| EP | 1136239 | 9/2001 |
| EP | 1 149 687 | 10/2001 |
| FR | 2667013 | 3/1992 |
| FR | 2771332 | 5/1999 |
| FR | 2844472 | 3/2004 |
| JP | 2001310798 A | 11/2001 |
| WO | WO-03035380 | 5/2003 |
| WO | WO-2004025003 A2 | 3/2004 |
| WO | WO-2005095091 | 10/2005 |

OTHER PUBLICATIONS

A Composite Preform http://www.priorartdatabase.com/IPCOM/000007326, 1 page, accessed Apr. 28, 1994.
Ando, Yoshinori et al., "Growing Carbon Nontubes," Materials Today, Oct. 2004, pp. 22-29, ISSN:1369 7021.
BAe 146, FLIGHT International, May 2, 1981.
Beechcraft's Composite Challange, http://www.aerotalk.com/Beech.cfm [accessed Mar. 1, 2004].
Brittles, P., New Development in RTM, 19th International BPF Composites Congress, BPF, Birmingham., Nov. 22-23, 1994, pp. 11-26 (8141 OA).
Business Aviation, Jun. 7, 2002, http://www.aviationnow.com/avnow/news/channel_busav.jsp?view=story&id=news/btoyo0607.xml [accessed Mar. 1, 2004].
CASA, SMAPE Journal, vol. 39, No. 1, Jan./Feb. 2003, p. 60.
CNC fiber placement used to create an all-composite fuselage; http//www.sae.org/aeromag/techinnovations/129t08.htm; available Oct. 5, 2000; 2 pgs.
Evans, Don O., "Fiber Placement", 3 pgs, Cincinnati Machine [no date available].
Fiedler, L. et al. "TANGO Composite Fuselage Platform", SAMPE Journal, vol. 39, No. 1, Jan. 2003.
Garcia, E.J. et al., "Hybrid Carbon Nanotube-Composite Architectures," MTL Annual Research Report, Sep. 2006, 1 pg.
Grimshaw et al., "Advanced Technology Tape Laying for Affordable Manufacturing of Large Composite Structures," (11 Pgs); http://www.cinmach.com/tech/pdf/TapeLayingGrimshaw.pdf.
Grimshaw, "Automated Tape Laying," (6 Pgs); http://www.cinmach.com/tech/pdf/Grimshaw%20ASM%20Handbook.pdf.
Growing Carbon Nanotubes Aligned with Patters; http://www.nasatech.com/Briefs/Oct02/NPO30205.html; accessed Mar. 21, 2007, 4 pgs.
Musch G. et al.: "Toolng with Reinforced Elastomeric Materials" Composites Manufacturing, Butterworth Scientific, Guildford, Surrey, GB, vol. 3, No. 2, Jan. 1992, pp. 101-111 XP000300776 ISSN: 0956-7143 col. 1, paragraph 3-col. 2, paragraph 2, figures 9, 10, 16.
Premier I Feature Lighter, Stronger All-Composite Fuselage, WolfTracks, vol. 4, No. 1, http://www.cinmach.com/wolfTracks4_1/MTG_WT7.htm [accessed Mar. 25, 2004].
Prof. J. Zhang: "Angewandte Sensorik" CH 4. Sensoren in Der Robotik, Nov. 11, 2003, pp. 76-113, XP002327793; URL:http://tech-www.informatik.uni-hamburg.de/lehre/ws2003/voriesungen/angewandte_sensorik/vorlesung_03.pdf, retrieved on Apr. 2004, p. 89.
Raytheon Aircraft Orders Four More Fiber Cincinnati Fiber Placement System for Industry's First Composite-Fuselage Business Jets, http://www.cinmach.com/compnews/PressReleases/pr00-11.htm [accessed Mar. 25, 2004].
Raytheon Aircraft's Hawker Horizon Reaches Fuselage Milestone, Raytheon News Release; http://www.beechcraft.de/Presse/2000/100900b.htm; [accessed Jun. 26, 2004] [had been omitted from chart].
Raytheon, Mar. 2000, vol. 4, No. 2, http://www.cts.com/king/vasci/newsletter/vol42.html [accessed Mar. 1, 2004].
Rocky Mountain Composites, Filament Winding, http://www.rockymountaincomposites.com/wind_sys.html; Filament Winding, 2 pgs [accessed Feb. 28, 2004].
Sharp et al; "Material Selection/Fabrication Issues for Thermoplastic Fiber Placement", Journal of Thermosplastic Composite Materials, vol. 8; Jan. 1995, pp. 2-14.
The Barrelful of Experience, Intervia, May 1992, 2 pgs.
The Longest Carbon Nanotubes You Have Ever Seen; http://www.spacemart.com/reports/The_Longest_Carbon_Nanotubes_You_Have_Ever_Seen_999.html; May 14, 2007; Space Mart.
Wondrous World of Carbon Nanotubes; http://students.chem.tue.nl/ifp03/synthesis.html; accessed Mar. 21, 2007; 23 pgs.
Woods et al. Controlled Atmospheric Pressure Resin Infusion (17 pages).
ACMA "Pultrusion Industry Council—Products & Process: Process description," copyright 2007, 2 pages.
Introduction to Vacuum Consumables booklet, no date available, 10 pages.
Velicki et al., "Damage Arrest Design Approach Using Stitched Composites," 2nds Aircraft Structural Design Conference, The Boeing Company, Huntington Beach California 92647-2099, 9 pages.

* cited by examiner

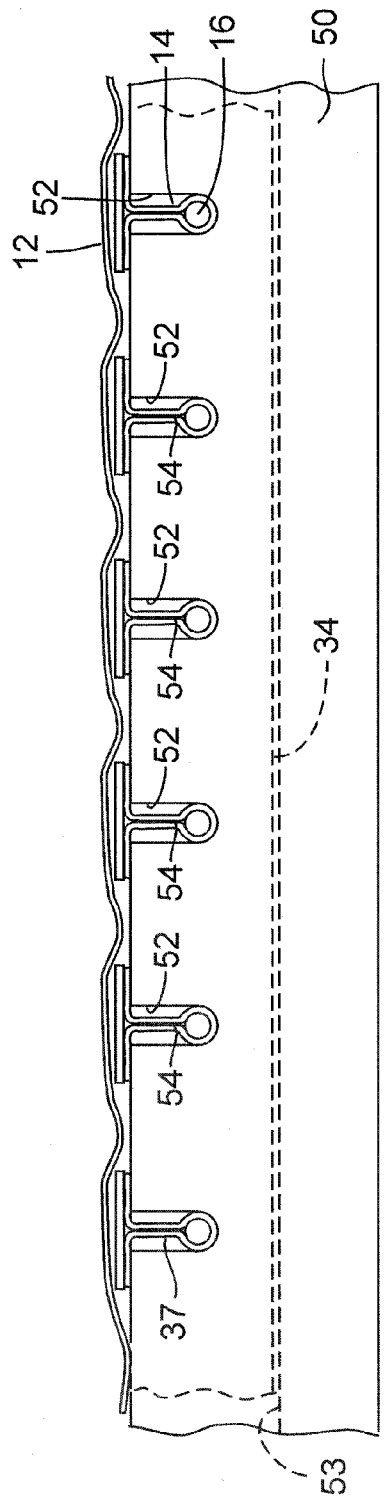
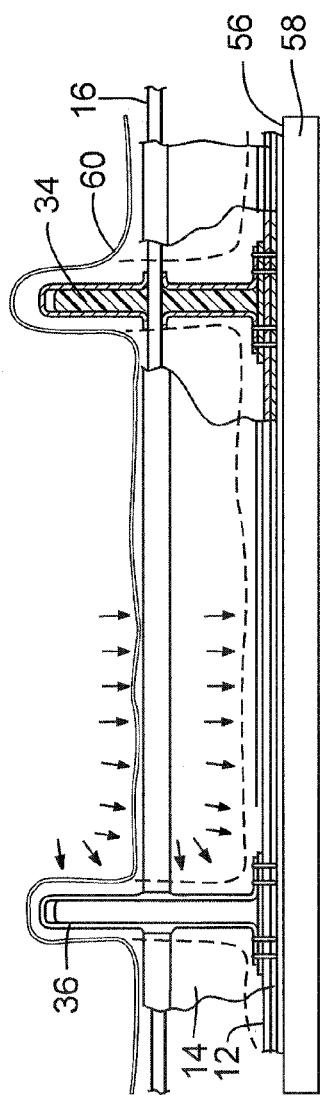
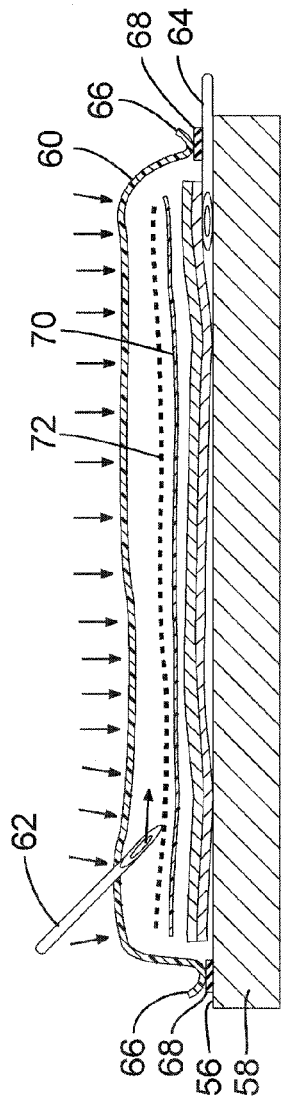

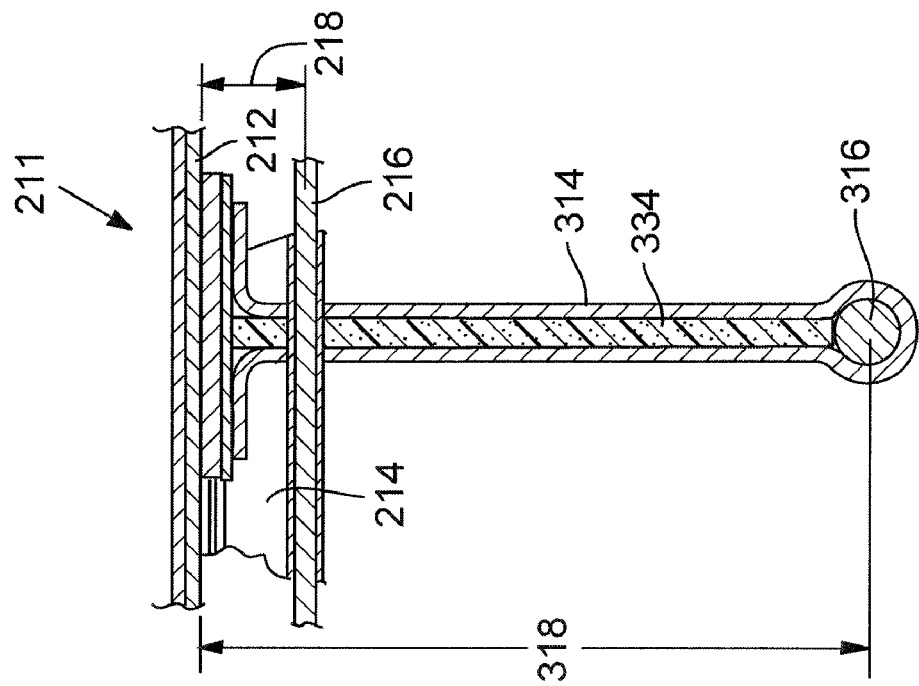
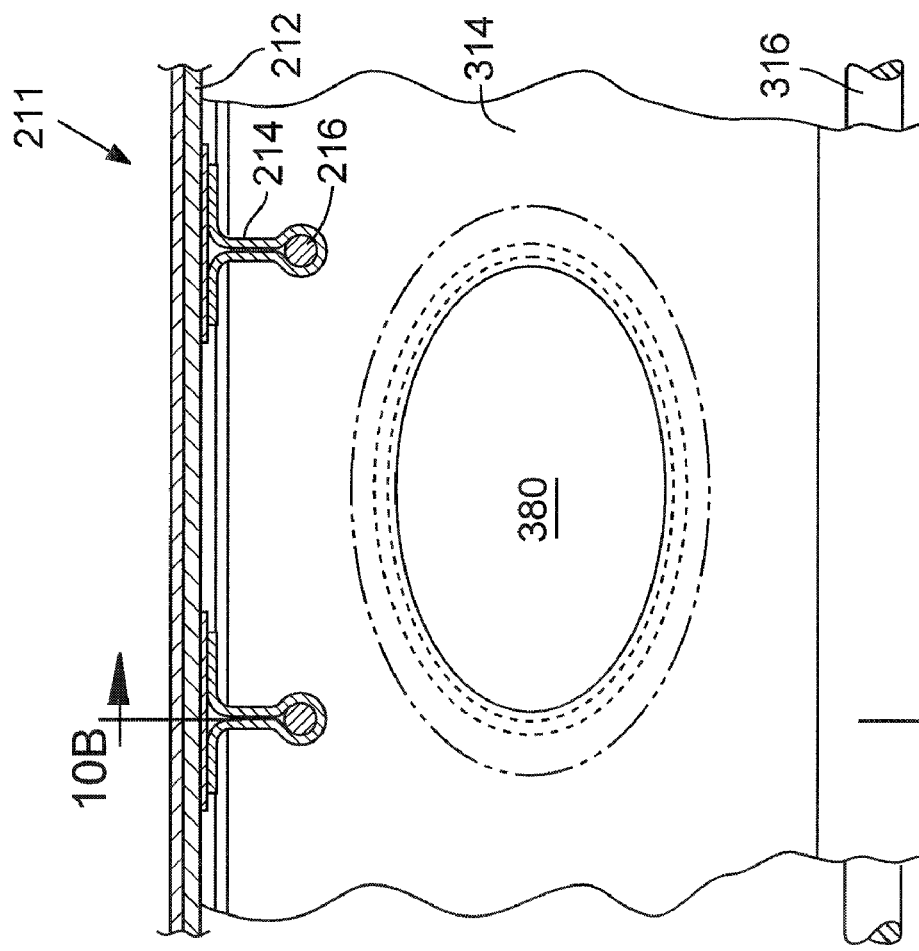

COMPOSITE FABRIC WITH RIGID MEMBER STRUCTURE

STATEMENT OF GOVERNMENT INTEREST

The invention was made with Government support under Contract Number F33615-00-D-3052 DO 0059 awarded by the Air Force. The Government has certain rights in this invention.

TECHNICAL FIELD

Embodiments relate to the field of aircraft construction, and, more specifically, to a composite fuselage section, a system and a method including a composite fabric structure with rigid member.

BACKGROUND

Various assemblies and methods of assembly exist for composite structures which require opposing mold halves adapted to form the shape and contour of opposite sides of the composite structure. Many require additional assembly operations to fasten components together. To form an aircraft fuselage using composites, a skin is first formed, which typically requires tooling for both the inner mold line and the outer mold line. Then the skin is fastened to longitudinal stringers and transverse frame members. Joining the skin to the stringers and frames requires multiple fasteners. In addition, the role an aircraft fuselage will play, for example, if used for a bomber aircraft verses an attack aircraft etc., will further dictate individualized tooling requirements.

There exists a need to reduce manufacturing tooling requirements, the number of parts for final assembly, and the number of assembly operations.

SUMMARY

The various embodiments may provide a composite structure and a manufacturing process for manufacturing a composite structure, for example, a composite fuselage section. The structure and process may use one or more rigid members, such as but not limited to carbon rods, supported by core supports at a distance from the outer mold line fabric lay-up. The rigid member may be wrapped with a fabric, the fabric may extend to and may be stitched to the mold line fabric lay-up. The rigid member may provide a support structure for the fabric during a cure cycle, and when cured, may form the webbing stringer elements of the structure. The rigid member may provide a support element during processing that may eliminate the need for inner mold line tooling which would otherwise be required to maintain the shape of the structure. Embodiments may reduce manufacturing costs, and improve part quality as the key structural elements, and may be cured in one operation versus being cured separately and then mechanically fastened together.

Embodiments may provide a composite structure including: a first fabric; a second fabric; a substantially elongate and substantially rigid first member spaced apart from and coupled with the first fabric via the second fabric; and a resin substantially infused into the first fabric and the second fabric, and substantially encapsulating the first member to form a unitary structure. The second fabric may be stitched to the first fabric along one or two seams which may be each substantially parallel with the first member. A portion of the first fabric between the two seams may be disposed to form a loop over the first member to couple the first member with the first fabric. A tightening stitch may be disposed through two locations on the second fabric adjacent the first member. A wrapping portion may be defined on the second fabric between the two locations, and the tightening stitch may be adapted to tighten the wrapping portion over the first member.

A second member may be disposed transverse to the first member and may be coupled with the first fabric via a third fabric. The resin may also be substantially infused into the second fabric and may substantially encapsulate the second member. The second member and the third fabric may also form part of the unitary structure.

In certain embodiments the unitary structure of the composite structure may form at least part of an aircraft fuselage. The first member may be oriented substantially parallel with a longitudinal axis of the fuselage, and the first fabric with the infused resin may be adapted to form a skin of the aircraft fuselage. The second member may form at least part of a cross-sectional frame member of the aircraft fuselage.

The composite structure of various embodiments may include a first member disposed to pass through the second member. The first member may be a pultruded rod. At least part of the second member may be made from foam core. The second fabric may be a warp-knit fabric and the warp of the fabric may be oriented substantially perpendicular to a longitudinal axis of the elongate first member.

Embodiments may include a method of manufacturing a composite structure. The method may include:

laying out a first fabric on a tool surface;

positioning an elongate first member a distance from the first fabric;

covering the first member with a second fabric such that tab-like portions of the second fabric contact the first fabric on opposite sides of the first member;

coupling the first member to the first fabric by securing the tab-like portions to the first fabric; and forming a unitary structure with the first fabric, the second fabric, and the first member by infusing a resin into the first fabric and the second fabric and encasing the first member within the resin.

The covering the first member with the second fabric may include positioning the second fabric in a slot of a fixture forming a valley with the second fabric and positioning the rod in the valley.

In various embodiments the method may also include:

positioning a second member over the first fabric and transverse to the first member;

covering the second member with a third fabric such that other tab-like portions of the third fabric contact the first fabric on opposite sides of the second member;

coupling the second member to the first fabric by securing the other tab-like portions of the third fabric to the first fabric; and wherein the forming a unitary structure includes infusing the resin into the third fabric and encasing the second member within the resin. The securing the second fabric and the securing the third fabric may be by stitching.

Various methods in accordance with various embodiments may also include:

positioning a substantially airtight film over the combination of the first member, the second member, the first fabric, the second fabric, and the third fabric; and forming a vacuum between the tool surface and the film, and wherein the infusing includes introducing the resin between the tool surface and the film. The method may also include curing the resin. The first member may be a pultruded rod. The second fabric may be a warp-knit fabric and may further comprise orienting the warp of the warp-knit substantially perpendicular to a longitudinal axis of the elongate first member.

Embodiments may provide an aircraft fuselage including: a fuselage skin including a first fabric; two or more stringer members oriented longitudinally within the fuselage each including an elongate rigid first member disposed a distance from the skin and coupled with the skin via a second fabric, two or more frame members of sufficient rigidity to support the first members at the distance from the skin and coupled with the skin via a third fabric; and a resin infused into the first, second, and third fabrics and which substantially encapsulates the first and second members.

Embodiments providing an aircraft fuselage may include the second fabric being looped over the first member. The second fabric may be long enough to form at least one tab-like portion that contacts the first fabric. The at least one tab-like portion may be stitched to the first fabric.

With certain embodiments which may provide an aircraft fuselage, the first members may be pultruded rods. At least part of the two or more of the frame members may be made from foam core. The second fabric may be a warp-knit fabric and the warp of the fabric may be oriented substantially perpendicular to longitudinal axes of the elongate rigid first members.

Various embodiments may provide an assembly to form a composite assembly, which may include: a first fabric laid on a surface; a second member laid on the first fabric; a third fabric draped over the second member, having two flaps that extend beyond either side of the second member. The two flaps may each be stitched to the first fabric. An elongate first member may pass through the second member and may be supported by the second member a distance from the first fabric. A second fabric may be draped over the first member which may have two other flaps that extend down from the first member. The two other flaps may each be stitched to the first fabric. The assembly may also include a substantially airtight film placed over the first and second members and the first, second, and third fabrics. The assembly may also be adapted to form a vacuum seal between the film and the surface, and further adapted for a resin to be introduced between the film and the surface. The first and second members may be included in at least a portion of the completed composite assembly.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 6 illustrates an end view of a fixture that may be used in the assembly of various embodiments;

FIG. 7 illustrates a side view with portions in cutaway view for illustration in accordance with various embodiments;

FIG. 8 illustrates a somewhat schematic view of portions of an assembly process in accordance with various embodiments;

FIG. 10A illustrates a side view and FIG. 10B illustrates a cross-sectional view taken at the line 10B-10B in accordance with various embodiments;

DETAILED DESCRIPTION OF VARIOUS EMBODIMENTS

Figure 1:
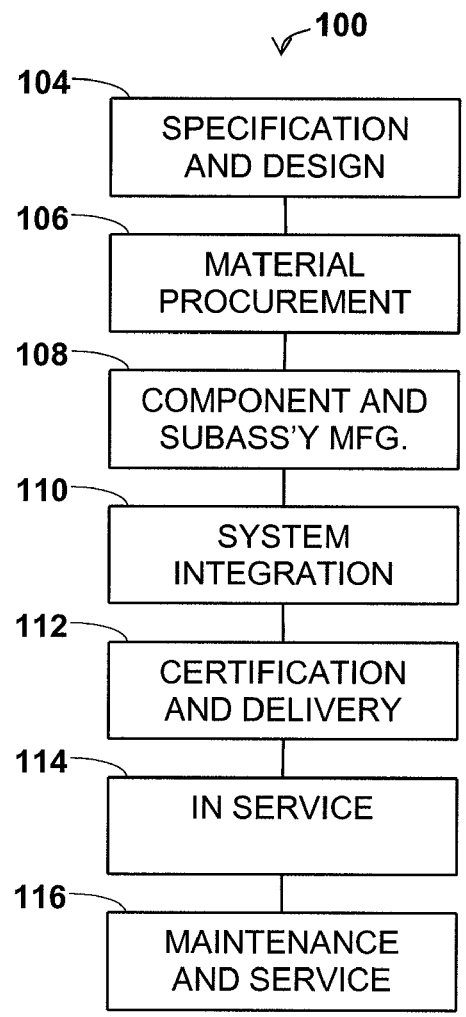
FIG. 1 is a flow diagram of aircraft production and service methodology.

In the following detailed description, reference is made to the accompanying drawings which form a part hereof, and in which are shown by way of illustration embodiments which may be practiced. It is to be understood that other embodiments may be utilized and structural or logical changes may be made without departing from the scope of the disclosure. Therefore, the following detailed description is not to be taken in a limiting sense, and the scope of embodiments is defined by the appended claims and their equivalents.

Various operations may be described as multiple discrete operations in turn, in a manner that may be helpful in understanding the embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of the embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" means A or B. For the purposes of the description, a phrase in the form "A and/or B" means "(A), (B), or (A and B)." For the purposes of the description, a phrase in the form "at least one of A, B, and C" means "(A), (B), (C), (A and B), (A and C), (B and C), or (A, B and C)." For the purposes of the description, a phrase in the form "(A)B" means "(B) or (AB)," that is, A is an optional element.

The description may use the phrases "in an embodiment," or "in embodiments," which may each refer to one or more of the same or different embodiments. Furthermore, the terms "comprising," "including," "having," and the like, as used with respect to the embodiments, are synonymous.

Embodiments may provide a very efficient airframe structure having the skin, stringers, and frame elements which may maintain residual load-carrying capabilities under a variety of damage scenarios. Embodiments may enable higher operating strains and ultimately a lighter airframe. In addition to the improved structural performance, embodiments of, for example, dry carbon fiber, pultruded rods, and stitching thread may also provide manufacturing advantages. A self-supporting stitched preform design of various embodiments may include a new out-of-autoclave fabrication approach that may provide orders of magnitude lower building costs than would otherwise be possible using traditional composite design and manufacturing practices.

Embodiments may provide larger one-piece occurred panel designs with seamless transitions and damage-arrest interfaces. Embodiments may also provide performance and cost advantages that are capable of enabling a whole new generation of highly-contoured aircraft designs that may result in substantially improved mission capabilities and lower life cycle costs for future aircraft, including military aircraft.

Figure 2:
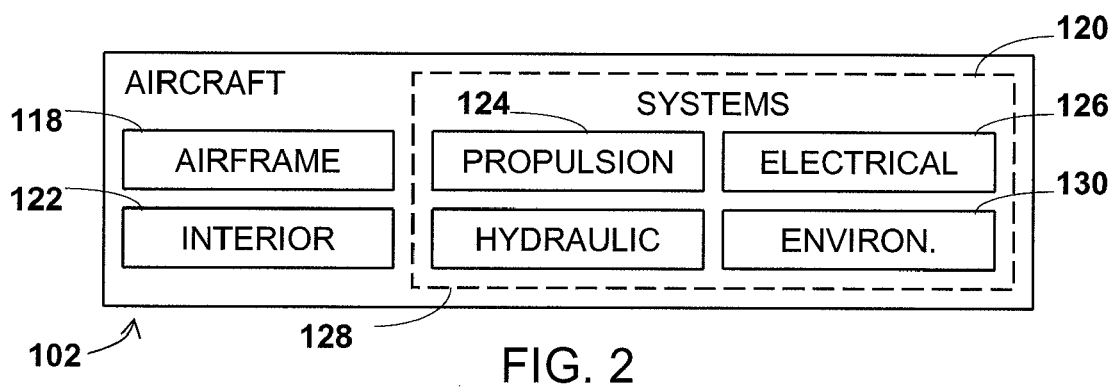
FIG. 2 is a block diagram of an aircraft.

Referring more particularly to the drawings, embodiments of the disclosure may be described in the context of an aircraft manufacturing and service method 100 as shown in FIG. 1 and an aircraft 102 as shown in FIG. 2. During preproduction, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 3A:
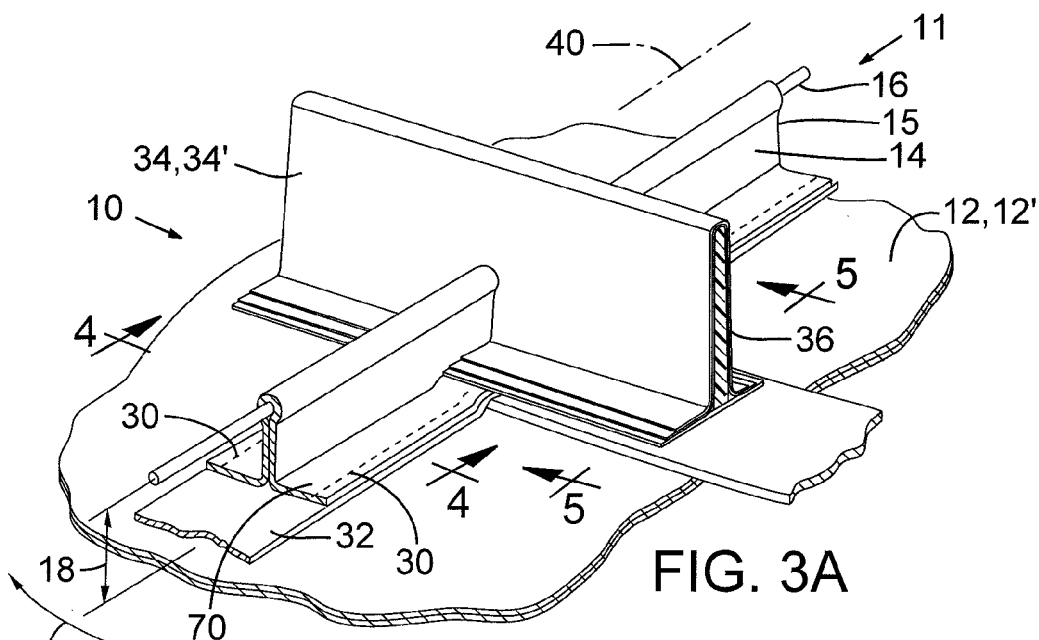
FIG. 3A illustrates a perspective view, and FIG. 3B an exploded perspective view in accordance with various embodiments.
Figure 3B:
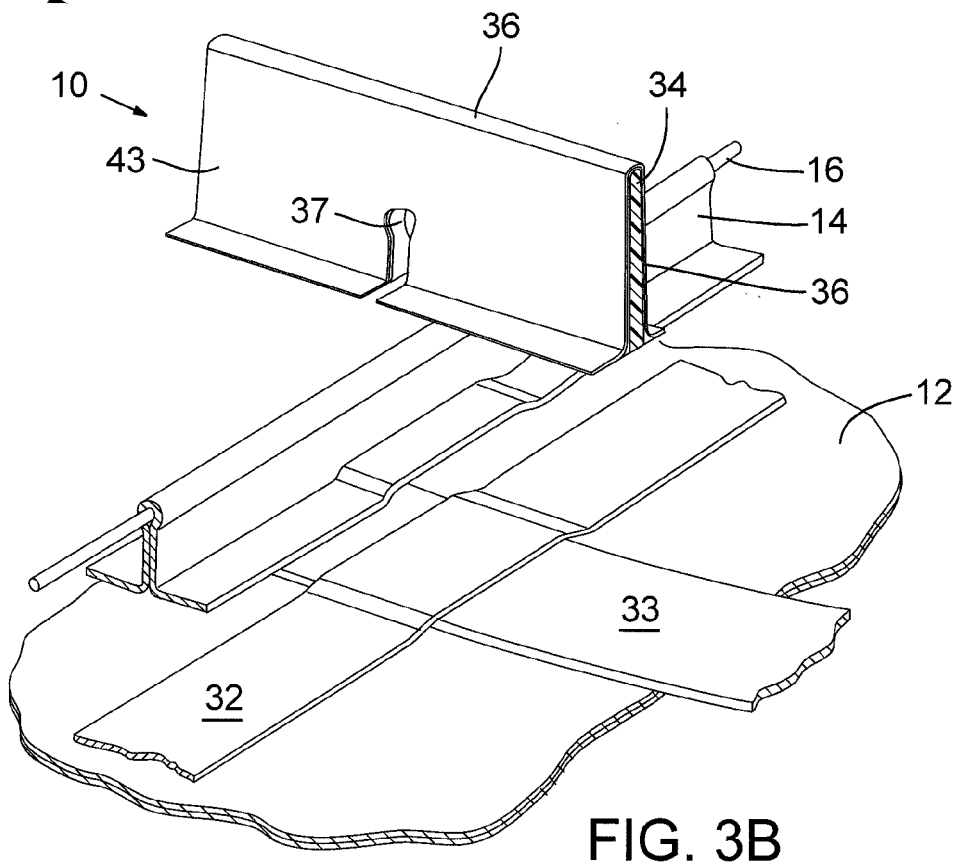

FIG. 3A is a perspective view and FIG. 3B is an exploded perspective view illustrating various embodiments. A composite structure 10 may include a first fabric 12, and a second fabric 14. The embodiment illustrated may include a substantially elongate and substantially rigid first member 16 spaced apart from and coupled with the first fabric 12 via the second fabric 14. The first member 16 may be spaced from the first fabric 12 by a distance 18. A resin may be infused into the first fabric 12 and the second fabric 14, and may also encapsulate the first member 16 to form a unitary structure 11. Examples of structure and methods for applying the resin in accordance with various embodiments are discussed below.

Figure 4:
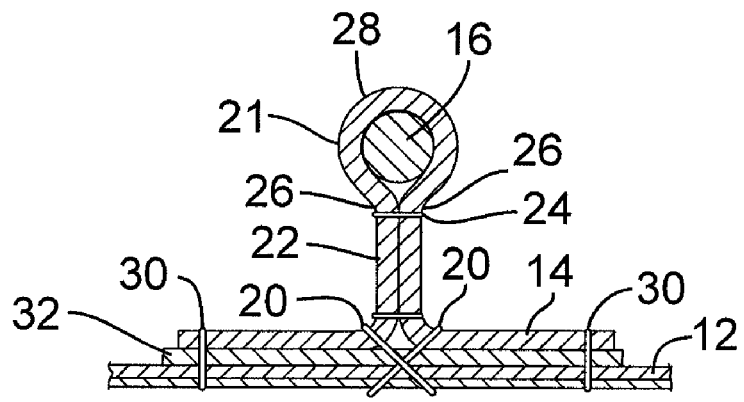
FIG. 4 illustrates a cross-sectional view taken at line 4-4 in FIG. 3A.

FIG. 4 is a cross-sectional view taken through the line 4-4 in FIG. 3A. The second fabric 14 may be stitched to the first fabric 12 along two seams 20. Each of the seams 20 may be substantially parallel with the first member 16 such that a portion 22 of the first fabric between the two seams 20 may be disposed to form a loop 21 over the first member 16 to couple the first member 16 with the first fabric 12. While first member 16 is shown as a rod for illustration and without limitation any structural shape may be used. While first member 16 is shown with a uniform cross section over its length, the cross section shape and/or size of first member 16 may vary over its length. A tightening stitch 24 may be disposed through two locations 26 on the second fabric 14 adjacent the first member 16. A wrapping portion 28 may be defined on the second fabric 14 between the two locations 26. The tightening stitch 24 may be adapted to tighten the wrapping portion 28 over the first member 16. Additional stitching rows 30 may also serve to couple the second fabric 14 to the first fabric 12. A tear strap 32 may be disposed between the first fabric 12 and the second fabric 14.

Figure 5:
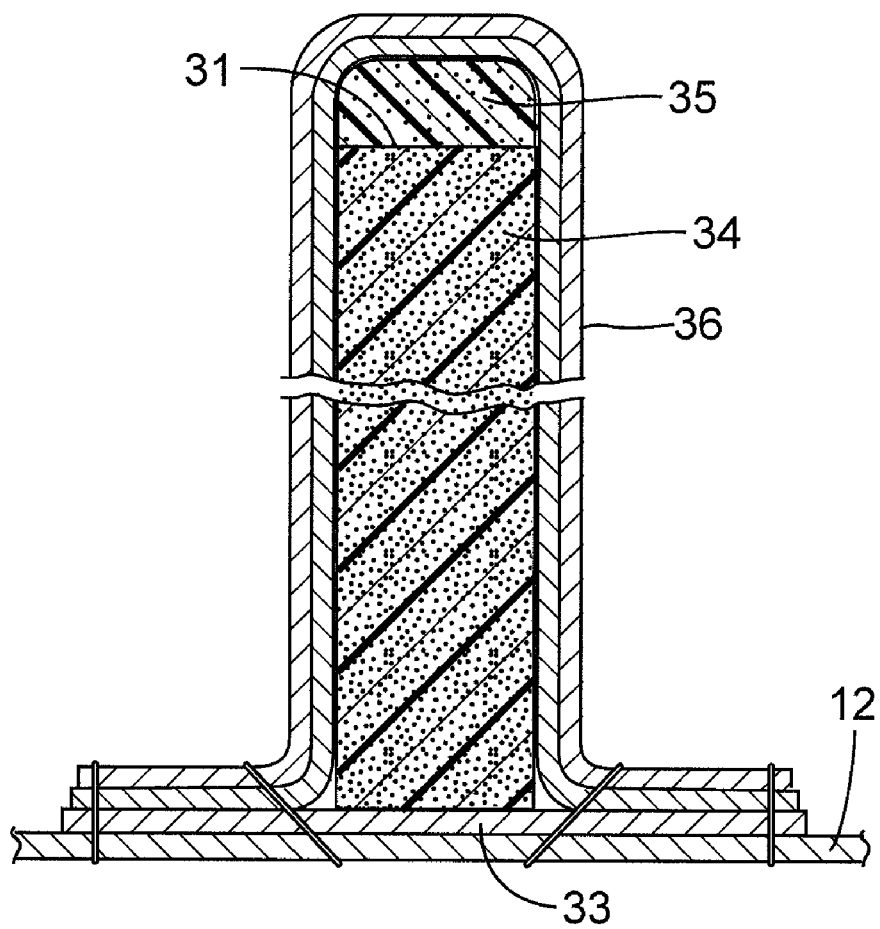
FIG. 5 illustrates a cross-sectional view a portion of a flooring panel taken at line 5-5 in FIG. 3A.

FIG. 5 is a cross-sectional view taken through the line 5-5 in FIG. 3A. Referring now to FIG. 5 and also to FIGS. 3A and 3B, a second member 34 may be disposed transverse to the first member 16 and may be coupled with the first fabric 12 via a third fabric 36. The resin may also be infused into the third fabric 36 and may encapsulate the second member 34. The second member 34 and the third fabric 36 may form part of the unitary structure 11. First and second members could be graphite and/or foam or some other material. Both could be any structural shape and/or have a cross section that varies over its length.

In various embodiments the first member 16 may pass through the second member 34. The second member 34 may support the first member 16 at the distance 18 (FIG. 3A). The first member 16 may be a pultruded rod. At least part of the second member 34 may be made substantially from foam core.

Still referring to FIGS. 3A and 3B, various embodiments can be used to form all or part of an aircraft fuselage. The fuselage may include a fuselage skin 12'. The fuselage skin 12' may include a first fabric 12. Two or more stringer members 15 may be oriented longitudinally with a longitudinal axis 40 of the fuselage. Each stringer members 15 may include an elongate rigid first member 16 disposed a distance 18 from the fuselage skin 12'. Each elongate rigid and first member 16 may be coupled with the fuselage skin 12' via a second fabric 14. Two or more frame members 34' may be oriented transverse to the fuselage and may be of sufficient rigidity to provide support for the first members 16 at the distance 18 from the skin 12'. The frame members 34' may be coupled with the skin 12' via a third fabric 36. A resin may be infused into the first 12, second 14, and third fabrics 36 and may encapsulate the first 16 and second members 34. The second fabric 14 may be looped over the first member 16 and may be long enough to form at least one tab-like portion 70 that contacts the first fabric 12. The at least one tab-like portion 70 may be stitched to the first fabric 12.

Frame members 34' may run perpendicular to the stringers 16' in a radial direction 41 and may be spaced at, for example, roughly 20-inch intervals and may be constructed, for example and without limitation, from a foam-core design wrapped within warp-knit fabric. The second members 34 may include additional material buildups at the top 31 and base 33 to provide bending stiffness. For example, frame caps 35 (FIG. 5) may be used and may be continuous annularly around the fuselage. Slots 37 (FIG. 3B) may be cut in frame member 34' webs 43 to allow stringer members 15' to pass through. The excess frame web material at each stringer slot 37 may drape around the stringer members 15' to provide a fillet flange that would strengthen the intersection. Other prominent airframe features like window and door assemblies may also be included in an integrated design.

FIG. 5 illustrates the third fabric 36 as having two plies or layers of fabric. Various embodiments may use various numbers of layers, various fabric types and technologies for any and all of the first, second, and third fabrics. For example, a dry warp-knit fabric may be used. Warp-knitting technology may provide the flexibility of mixing tow concentrations and material types. For example, carbon and glass of various tensile strengths and moduli, at various orientations and locations may be utilized to create highly optimized multiaxial fabrics. These fabrics can be specifically tailored for different applications and in the case of aircraft fuselage construction for different aircraft types and loading conditions to optimize cost and weight. Embodiments may enable a multirole design because it may offer an inexpensive way to optimize the weight and cost performance of the basic material for each application or aircraft type. For example, multiple aircraft differing roles, i.e., bomber, passenger, etc. may be assembled using common tooling and common parts but having differing features.

FIG. 6 is an end view illustrating various embodiments wherein a fixture 50 may be used as an aide to assemble various elements. Multiple, for example six, second fabrics 14 may be positioned in multiple slots 52 in the fixture 50 forming multiple valleys, or pockets 54 with the second fabrics 14. Multiple first members 16 in the form of elongated rods 16 may be positioned in the valleys, or pockets 54. One or more second member 34 may be disposed in respective one or more transverse slots 53 in the fixture 50. The one or more second members may include slots 37 through which the first members 16 and second fabrics may pass. The slots may be keyhole shaped as illustrated, and may be adopted to support the first members 16 during fabrication. The first fabric 12 may then be coupled with each of the second fabrics 14.

FIG. 7 is a side view with a portion cutaway for illustration of an assembly in accordance with various embodiments. The assembly illustrated in FIG. 4 may be removed from the fixture and placed on a surface 56 which may be on an outer mold line 58. A substantially airtight film 60 may be placed over the first and second members 16, 34 and the first, second and third fabrics 12, 14, 36, and adapted to form a vacuum seal between the film 60 and the surface 56. The first and second members 16, 34 may be included in at least a portion of the completed composite assembly.

FIG. 8 is a cross-sectional view illustrating, somewhat schematically, embodiments wherein the resin may be introduced and/or infused into the assembly. The resin may be pushed through the assembly which may be a dry carbon perform by a vacuum-induced pressure differential, that may not only promote resin flow but which may also create a pressure differential across the film 60 vacuum bag surface. A resin inlet 62 may introduce the resin under the film 60 while, or after, or just before a vacuum line 64 creates the pressure differential. This pressure may compact the preform and may enable laminate fiber volumes of nearly 60%. Even relatively low-pressure processing techniques may achieve higher fiber volume fractions and mechanical properties. The process may be superior to state-of-the-art prepreg material systems that typically require autoclave processing environments.

The edges 66 of the film 60 may be sealed to a surface 56 of a mold 58 with a seal 68, such as a sealant tape. As illustrated the seal 68 may pass over, for example, the vacuum line 64. A peel ply 70 may be used to, without limitation, leave a clean and contaminant free surface, and/or leave a textured surface. The peel ply 70 may be applied as the last material in the composite laminate sequence, and may be removed following a curing operation. A breather or bleeder fabric 72 may be used to, for example, to ensure that air or other gas sealed under the vacuum bag can be easily extracted and for more uniform vacuum distribution. The breather fabric 72 may also absorb excess resin that may be bled from the laminate.

Figure 9A:
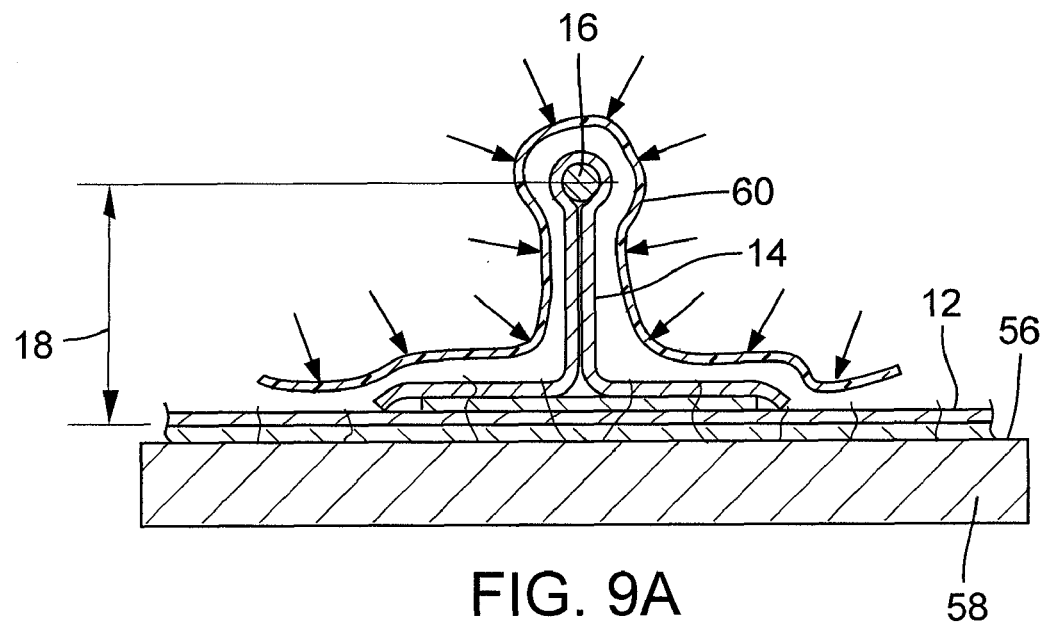
FIGS. 9A and 9B illustrate cross-sectional views of respectively different embodiments illustrating selected design parameters being varied and respective varied resultant structures.
Figure 9B:
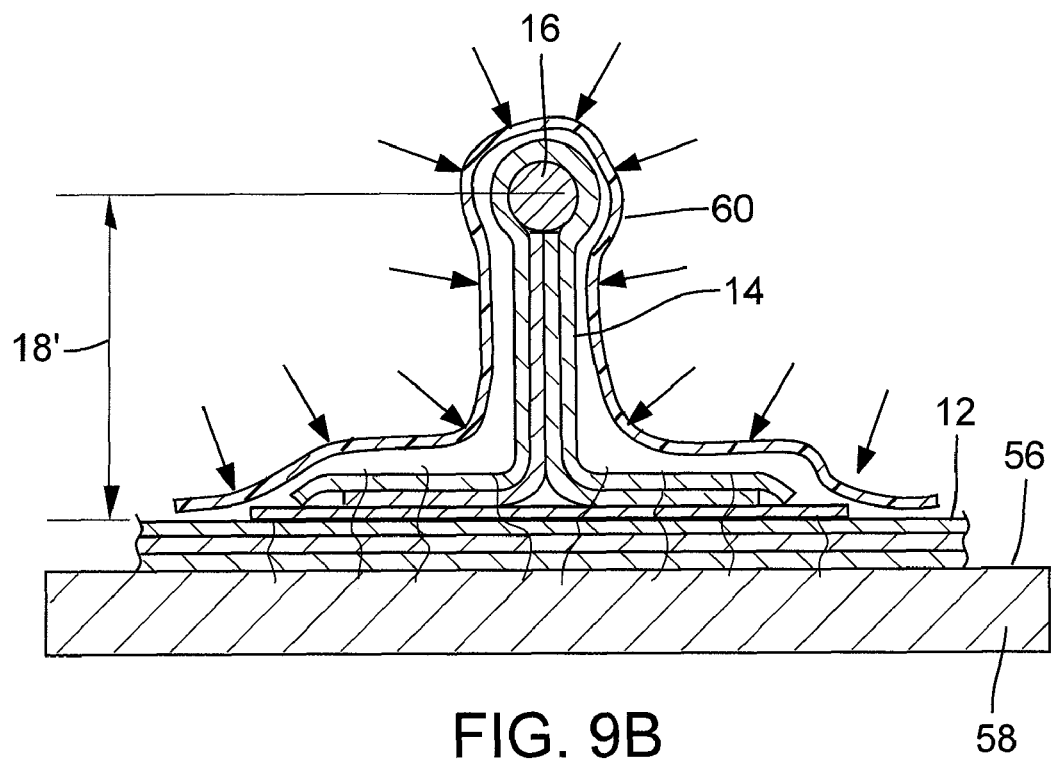

FIGS. 9A and 9B illustrate cross-sectional views similar to FIG. 4 in accordance with various embodiments. Each view illustrates a first member 16 disposed at a distance 18 or 18' from the first fabric 12, and coupled to the first fabric 12 with the second fabric 14. Each arrangement is illustrated between a substantially air tight film 60 and an outer mold line 58 surface 56. A comparison of FIGS. 9A and 9B may illustrate the versatility of various embodiments, as the same outer mold line 58 may be used for various end products by simply varying selected parameters of the design with little or no additional investment in tooling or training. The parameters that may be varied and may include but may not be limited to: the length and thickness of the fabrics 12, 14; the number of layers of fabric 12, 14; the distance 18 or 18' of the first member 16 from the first fabric 12; the amount of resin used; and the pressure at which the resin is introduced. It will be understood that similar versatility can be demonstrated regarding the second member 34.

FIG. 10A is a front view and FIG. 10B is a side view taken through the line 10B-10B of FIG. 10A in accordance with various embodiments. A substantially elongate and substantially rigid first member 216 may be coupled with the first fabric 212 via a second fabric 214, and spaced a first distance 218 from the first fabric 212. In addition, a substantially elongate and substantially rigid second member 316 may be coupled with the first fabric 212 via a third fabric 314, and spaced a second distance 318 from the first fabric 212. A substantially rigid insert 334 may be disposed within the third fabric 314. The insert 334 may be adopted to support the first member 216, and may also be adopted to support and/or maintain the second member 316 at the distance 318. The insert 334 may be foam core 334. The third fabric 314 may include a hole 380 located to enable something to pass through, for example and without limitation, a pipe, wiring or conduit. The hole 380 may also be adapted as a window, or an opening for inspection and/or maintenance.

A resin may be infused into the first fabric 212, the second fabric 214 and third fabric 314, and may also encapsulate the first member 216 and the second member 316, to form a unitary structure 211.

Figure 11A:
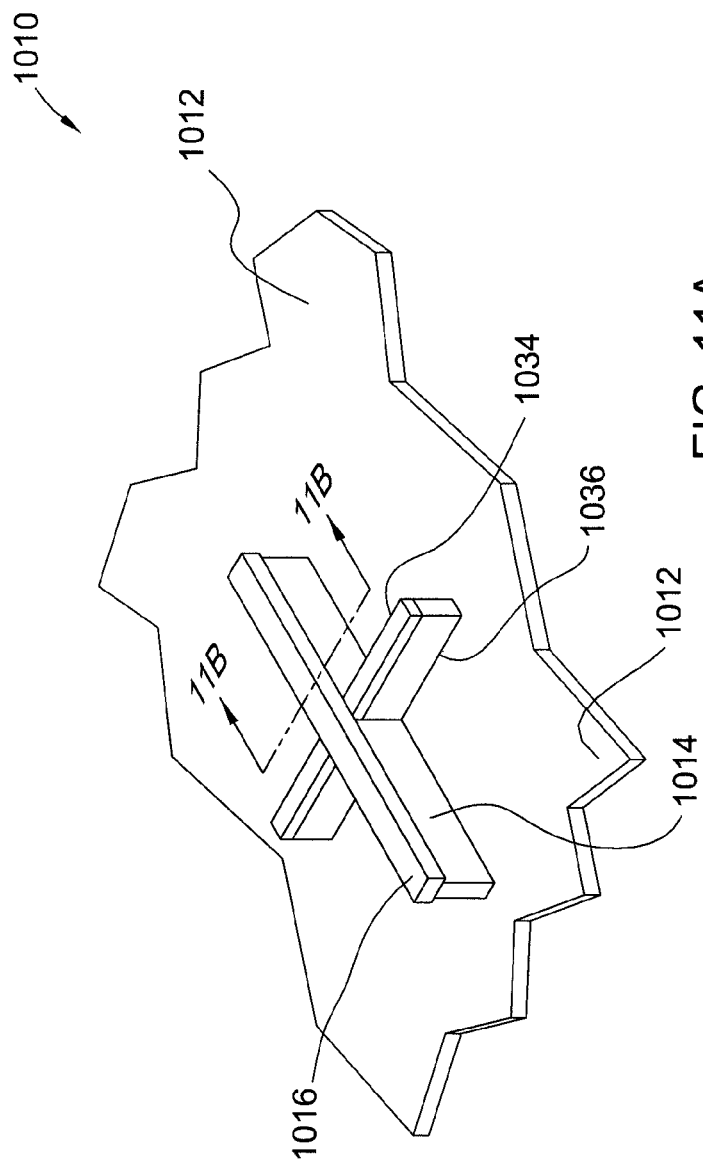
FIG. 11A is a block diagram and FIG. 11B is a cross-sectional view taken at the line 11B-11B in FIG. 11A.
Figure 11B:
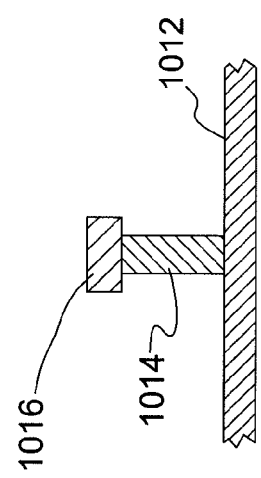

FIG. 11A is a block diagram and FIG. 11B is a cross-sectional view taken at the line 11B-11B in FIG. 11A illustrating various embodiments. A composite structure 1010 may include a first fabric 1012, a second fabric 1014, and a substantially elongate and substantially rigid first member 1016 spaced apart from and coupled with the first fabric 1012 via the second fabric 1014. The composite structure 1010 may further include a second member 1034 disposed transverse to the first member 1016 and coupled with the first fabric 1012 via a third fabric 1036.

Figure 12:
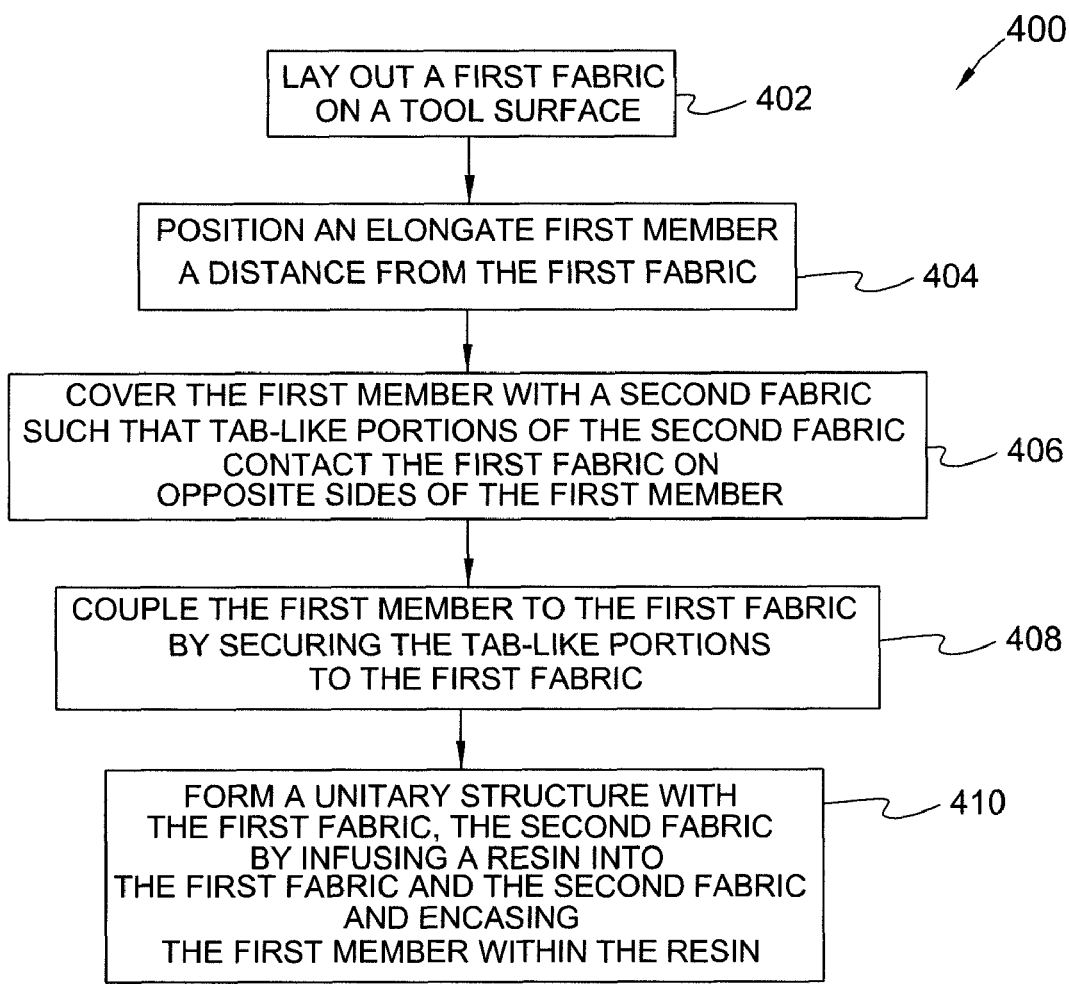
FIG. 12 is a flow diagram illustrating a method in accordance with various embodiments.

FIG. 12 illustrates a method 400 in accordance with various embodiments. The method may include a method of manufacturing a composite structure comprising: laying out a first fabric on a tool surface, 402;

positioning an elongate first member a distance from the first fabric, 404;

covering the first member with a second fabric such that tab-like portions of the second fabric contact the first fabric on opposite sides of the first member, 406;

coupling the first member to the first fabric by securing the tab-like portions to the first fabric, 408; and forming a unitary structure with the first fabric, the second fabric, and the first member by infusing a resin into the first fabric and the second fabric and impregnating the first member within the resin, 410. The covering the first member with the second fabric may include positioning the second fabric in a slot of a fixture forming a valley with the second fabric and positioning the rod in the valley.

Various embodiments may provide that during any or all of the operations identified as 404, 406, and 408, any or all of the first member, second member, and first and second fabrics, may be tacked together using a tackifier. This may allow formation of more complex preforms in the steps prior to debalking, resin injection, and curing. Tacking together may be used along with, or instead of, stitching.

Figure 13:
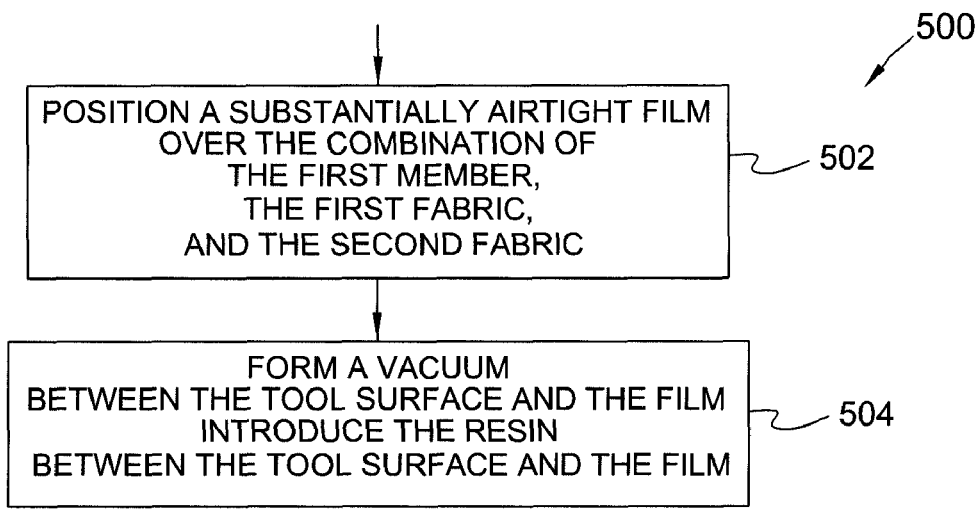
FIG. 13 is a flow diagram illustrating a method in accordance with various embodiments.

In various embodiments a method 500, shown in FIG. 13, may further comprise:

positioning a substantially airtight film or bag over the combination of the first member, the first fabric, and the second fabric, 502; and forming a vacuum between the tool surface and the film, and wherein the infusing includes introducing the resin between the tool surface and the film, 504.

Various embodiments may use operations that may be the same as or substantially similar to operations in methods described herein, or may be included with devices the same, or similar to, those described herein, that may utilize a pre-impregnated material already impregnated with a resin, also known as "prepreg".

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A composite structure comprising:
a first fabric;
a second fabric; and
a substantially elongate and substantially rigid first member spaced apart from and coupled with the first fabric via the second fabric, wherein the first member is substantially rigid prior to coupling the first member to the first fabric via the second fabric—, and a portion of the second fabric conforms to the shape of the first member—.

2. The composite structure of claim 1 further comprising a resin substantially infused into the first fabric and the second fabric.

3. The composite structure of claim 2 wherein the resin encapsulate the first member to form a unitary structure.

4. The composite structure of claim 2 further comprising a second member disposed transverse to the first member and coupled with the first fabric via a third fabric, the resin also infused into the third fabric.

5. The composite structure of claim 4 wherein the resin encapsulates the second member, the second member and the third fabric forming part of the unitary structure.

6. The composite structure of claim 5 wherein the unitary structure forms at least part of an aircraft fuselage, and the first member is oriented substantially parallel with a longitudinal axis of the fuselage, and the first fabric with the infused resin is adapted to form a skin of the aircraft fuselage, and the second member forms at least part of a cross-sectional frame member of the aircraft fuselage.

7. The composite structure of claim 4 wherein at least part of the second member is made from foam core.

8. The composite structure of claim 1 wherein the second fabric is stitched to the first fabric along at least one seam.

9. The composite structure of claim 1 wherein the second fabric is stitched to the first fabric along two seams each seam being substantially parallel with the first member and such that a portion of the second fabric between the two seams is disposed to form a loop over the first member to couple the first member with the first fabric.

10. The composite structure of claim 1 wherein the first member is a pultruded rod.

11. The composite structure of claim 1 wherein the second fabric is a warp-knit fabric and the warp of the fabric is oriented substantially perpendicular to a longitudinal axis of the elongate first member.

12. A composite structure comprising:
a first fabric;
a second fabric;
a substantially elongate and substantially rigid first member spaced apart from and coupled with the first fabric via the second fabric;
a tightening stitch disposed through two locations on the second fabric adjacent the first member; and
a wrapping portion defined on the second fabric between the two locations, wherein the tightening stitch tightens the wrapping portion over the first member—, and the wrapping portion conforms to the shape of the first member—.

13. The composite structure of claim 12 wherein the tightening stitch tightens the wrapping portion over the first member to conform the wrapping portion to the first member.

14. A composite structure comprising:
a first fabric;
a second fabric;
a substantially elongate and substantially rigid first member spaced apart from and coupled with the first fabric via the second fabric—, wherein a portion of the second fabric conforms to the shape of the first member—;
a second member disposed transverse to the first member and coupled with the first fabric via a third fabric, wherein the first member passes through a slot in the second member; and
a resin substantially infused into the first, second, and third fabrics.

15. An aircraft fuselage comprising:
a fuselage skin including a first fabric; and
two or more stringer members oriented longitudinally within the fuselage each including an elongate rigid first member disposed a distance from the skin and coupled with the skin via a second fabric, wherein the first members are rigid prior to coupling the first members to the first fabric via the second fabric—, and a portion of each second fabric conforms to the shape of each of the first members—.

16. The aircraft fuselage of claim 15 further comprising:
two or more frame members of sufficient rigidity to support the first members at the distance from the skin and coupled with the skin via a third fabric.

17. The aircraft fuselage of claim 16 further comprising:
a resin infused into the first, second and third fabrics and which substantially encapsulates the first and second members.

18. The aircraft fuselage of claim 16 wherein at least part of the two or more frame members are made from foam core.

19. The aircraft fuselage of claim 15 wherein the second fabric is looped over the first member and is long enough to form at least one tab-like portions that contacts the first fabric, the at least one tab-like portion being stitched to the first fabric.

20. The aircraft fuselage of claim 15 wherein the first members are pultruded rods.

21. The aircraft fuselage of claim 15 wherein the second fabric is a warp-knit fabric and the warp of the fabric is oriented substantially perpendicular to longitudinal axes of the elongate rigid first members.

* * * * *